H. WOOD, G. H. FOURDRINIER & M. L. HASELDEN.
GRAIN DRIER.

No. 41,748. Patented Feb. 23, 1864.

2 Sheets—Sheet 2.

H. WOOD, G. H. FOURDRINIER & M. L. HASELDEN.
GRAIN DRIER.

No. 41,748. Patented Feb. 23, 1864.

Witnesses.

Inventors.

UNITED STATES PATENT OFFICE.

HENRY WOOD, OF MONTREAL, CANADA EAST, GEORGE HENRY FOURDRINIER, OF LYN, CANADA WEST, AND MARGARET L. HASELDEN, (EXECUTRIX OF RICHARD HASELDEN,) OF MONTREAL, CANADA EAST.

IMPROVEMENT IN GRAIN-DRIERS.

Specification forming part of Letters Patent No. 41,748, dated February 23, 1864.

*To all whom it may concern:*

Be it known that we, HENRY WOOD, of Montreal, in the Province of Canada East, and GEORGE HENRY FOURDRINIER, of Lyn, in the Province of Canada West, in conjunction with the late RICHARD HASELDEN, now deceased, but represented by his widow and executrix, MARGARET L. HASELDEN, of Montreal aforesaid, have invented a new and useful Improvement in Apparatus for Drying Grain, &c.; and we do hereby declare that the following is a full, clear, and exact description of the same, reference being had to the accompanying drawings, forming a part of this specification, in which—

Figure 1:
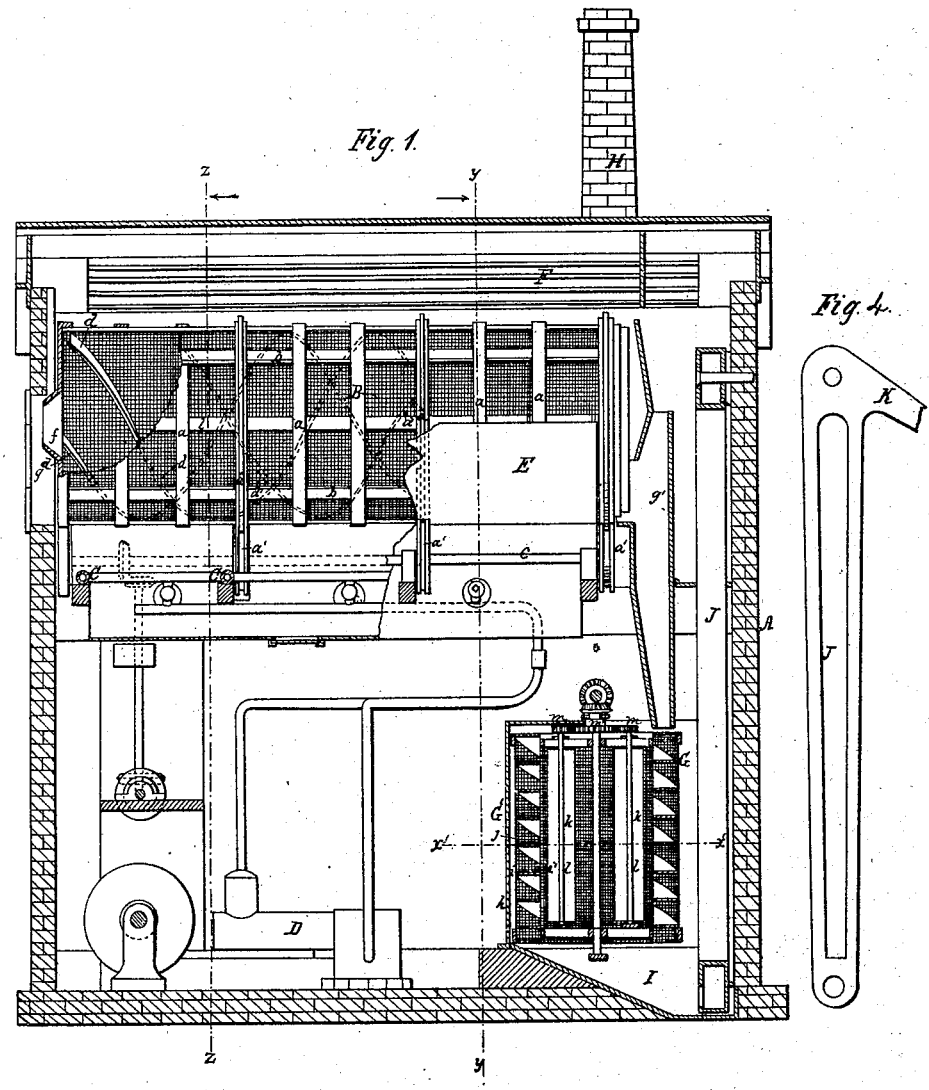
Figure 2:
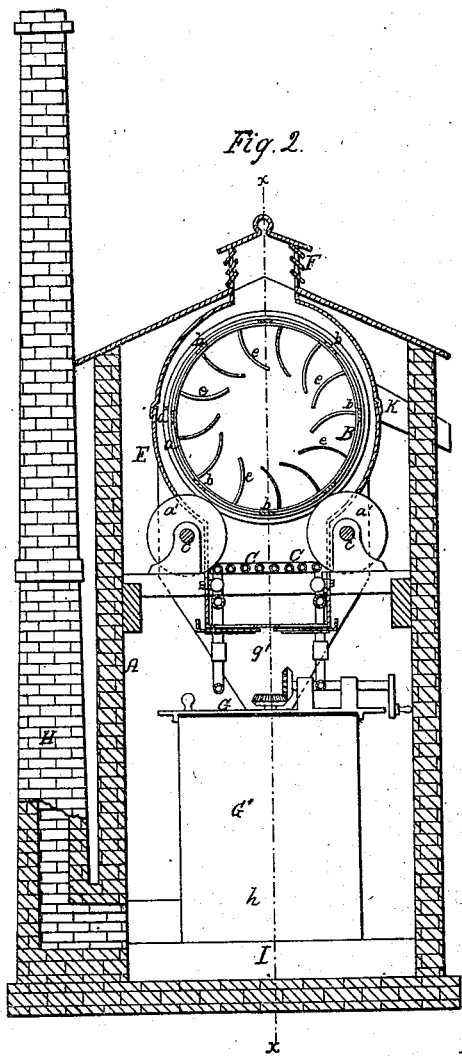
Figure 3:
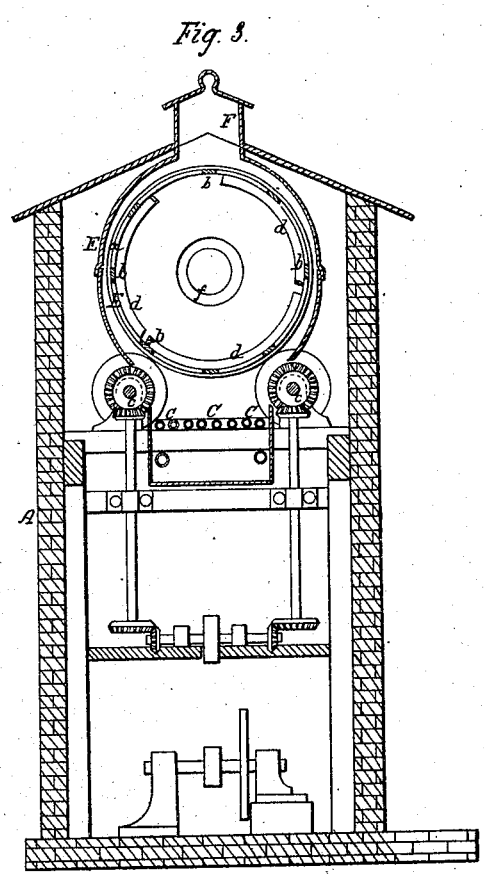
Figure 6:
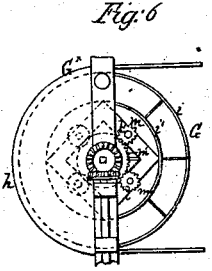

Figure 1 represents a longitudinal vertical section of our invention, the line $x\,x$, Fig. 2, indicating the plane of section. Fig. 2 is a transverse vertical section of the same, taken in the plane indicated by the line $y\,y$, Fig. 1, and looking in the direction of the arrow marked near that line. Fig. 3 is a similar section of the same, the plane of section being indicated by the line $z\,z$, Fig. 2, and looking in the direction of the arrow marked near that line. Fig. 4 is a side elevation of the elevator detached. Fig. 5 is a horizontal section of the revolving cooler, the plane of section being indicated by the line $x'\,x'$, Fig. 1. Fig. 6 is a plan or top view of the same.

Similar letters of reference in the several views indicate corresponding parts.

This invention relates to an apparatus for desiccating and curing grain, in which the grain is exposed to the action of hot air in a wire-gauze cylinder which revolves by the action of friction-rollers, and without a shaft or gudgeons, and which is provided on its interior with spiral flanges and lifters, whereby the grain is spread and fed slowly toward the discharging end of said cylinder. On leaving the cylinder the grain passes into a revolving cooler, which is provided with spiral passages or channel, and with a series of fan-blowers, so that the grain in passing through said channel is exposed to a draft of cold air, and finally on leaving the cooler the grain is elevated, and during its elevation it is also exposed to a draft of cold air, so that on being discharged from the apparatus it is perfectly cool and ready for the garners or vessels.

To enable others skilled in the art to make and use my invention, I will proceed to describe it.

A represents a building, made of brick or other suitable material and calculated to have three stories. The upper story is occupied by the cylinder B, which is constructed of wire-gauze and strengthened by a series of hoops, $a$, and longitudinal strips $b$, as clearly shown in Figs. 1, 2, and 3 of the drawings. This cylinder is open at both ends, and in practice it is to be sixty feet (more or less) long. It is supported on T-iron hoops $a^*$ and on grooved wheels $a'$, which are mounted on horizontal shafts $c$. On imparting a rotary motion to this shaft the friction between the wheels $a'$ and T-iron hoops $a^*$ imparts a rotary motion to the cylinder without requiring a central shaft passing through the same or gudgeons projecting from its heads.

The interior of the cylinder is furnished with three sets of spiral flanges, $d$, forming a triple screw-thread, and these flanges are secured to the interior of the longitudinal bars $b$, and serve to strengthen the same and to push the grain forward toward the discharge end of the cylinder. That portion of the cylinder next to the delivery end is provided with a series of twisted or winding shelves or lifters, $e$, to be used in addition to or independent of the spiral flanges $d$. The wide end of each of these lifters is secured to one of the longitudinal bars or strips $b$, and they project inward toward and beyond the center, and those sides facing toward the delivery end of the cylinder are dropped off, so as to feed the grain forward as the cylinder revolves.

The wire-gauze from which the covering of the cylinder is made is of such a fineness as to prevent the smallest grains for which the cylinder may be used from dropping through or getting between the meshes, and still the openings between said meshes are large enough to expose the grain to a current of hot air from below and to let the moisture pass out above. Instead of wire-gauze, perforated sheet-metal plates may be used for the purpose of covering the cylinders.

C are a series of steam-coils or serpentine pipes, which are arranged under the cylinder B, and which are supplied with steam from a boiler, D, in the lowest story of the building. This boiler also supplies the requisite quantity of steam to drive an engine which serves to impart motion to the various parts of the desiccator. The heat radiating from the steam-coils C strikes the grains in the cylinder, and the moisture contained in the latter is rapidly expelled. A jacket, E, which surrounds the cylinder and the heating-pipes, and which extends up to the louvers F, compels the hot air to pass through the cylinder and conducts the moist air rising from the grain through the louvers out into the open atmosphere.

The grain is introduced into the cylinder B through a conically-constructed mouth-piece, $f$, near a window, $g$, at one end of the building, (see Fig. 1,) and it may be raised to this mouth-piece from below by means of an elevator, or it may be conducted to it from garners above by means of suitable troughs or conductors. After having passed through the cylinder the grain is discharged through the action of the spiral flanges $d$ and lifters $e$, and it is conducted through a chute or tube, $g'$, to the rotary cooler G. This cooler is situated near one end of the building A, in a compartment, G*, which is separated from the other parts by means of a partition wall or jacket, $h$, and which communicates with a chimney, H, or with an exhauster, so that a continuous current of air is created through the compartment G* and the cooler G. This cooler consists of two wire-gauze cylinders, $i\ i'$, one passing round the other, and the space between the two cylinders is occupied by spiral passages $j$, through which the grain has to travel before it is allowed to discharge from the cooler.

The interior of the inner cylinder, $i'$, is occupied by four (more or less) fan-blowers, $k$, which rotate on vertical arbors $l$, and which extend throughout the full height of the cylinder. The upper ends of the arbors $l$ carry pinions $m$, which gear into a cog-wheel, $m'$, on the central shaft of the cooler, and by imparting to the cooler a rotary motion each of the fan-blowers receives an independent rotary motion round its own axis, and a strong current of air is thrown against the grain passing down through the spiral channels between the two cylinders $i\ i'$.

When the grain has reached the bottom end of the cooler, it discharges into a pit, I, at the bottom of the compartment G*, and from this pit it is raised by an elevator, J, and discharged through the spout K. The elevator J passes up through the compartment G*, and consequently is exposed to the vacuum draft of the chimney H, or of an exhauster, if such is used, and by these means the elevator itself acts as an ascending cooler, and the grain, on reaching the spout K, is discharged perfectly cool and ready for the garner or vessel.

It is obvious that two or more desiccating-cylinders can be arranged side by side, and the capacity of the apparatus can thus be increased to any desired extent.

What we claim as new, and desire to secure by Letters Patent, is—

1. The employment or use, for the purpose of drying grain, of a cylinder, B, revolving on wheels $a'$, and hubs $a^*$, secured to its circumference, and provided on its inside with spiral flanges $d$ and lifters $e$, substantially in the manner herein shown and described.

2. The steam-coils C and jacket E, arranged in combination with the perforated cylinder B, rotated by means of the friction-rollers $a'$, and louvers F, in the manner and for the purpose set forth.

3. The rotary cooler G, provided with spiral passages $j$, between two perforated cylinders, $i\ i'$, and with fan-blowers $k$, to which motion is imparted by a sun-and-planet gear, $m\ m'$, in the manner and for the purpose substantially as herein specified.

4. The compartment G*, in combination with the cooler G, elevator J, and chimney H, or its equivalent, constructed and operating in the manner and for the purpose substantially as described.

HENRY WOOD.
  GEORGE H. FOURDRINIER.
  MARGT. L. HASELDEN.

Witnesses:
 W. L. KINMOND,
 P. LEIGHTON KINMOND.